(No Model.) 2 Sheets—Sheet 1.
S. H. SHELLEY.
FRUIT SPLITTING MACHINE.
No. 554,037. Patented Feb. 4, 1896.
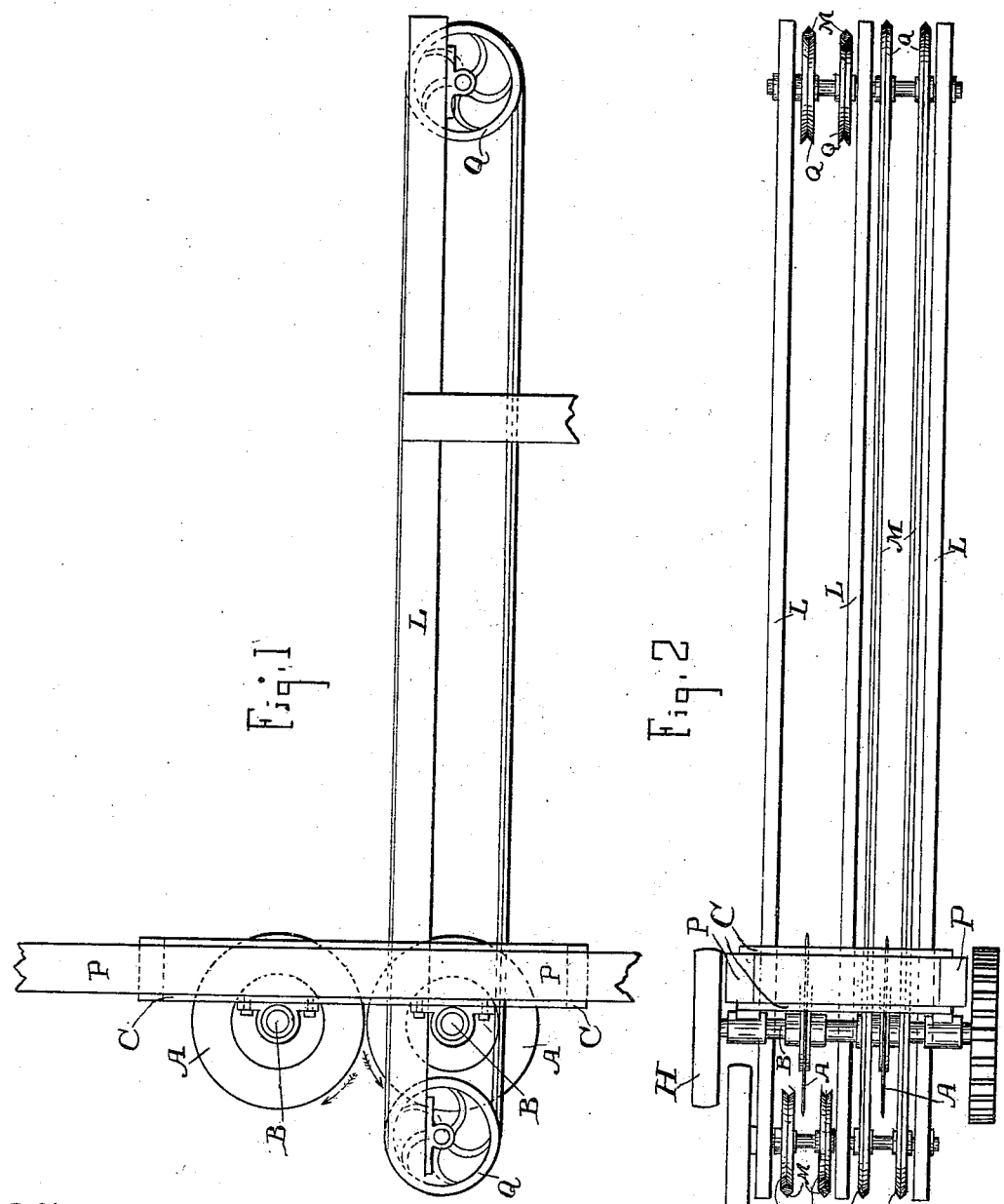

(No Model.)
2 Sheets—Sheet 2.
S. H. SHELLEY.
FRUIT SPLITTING MACHINE.
No. 554,037.
Patented Feb. 4, 1896.
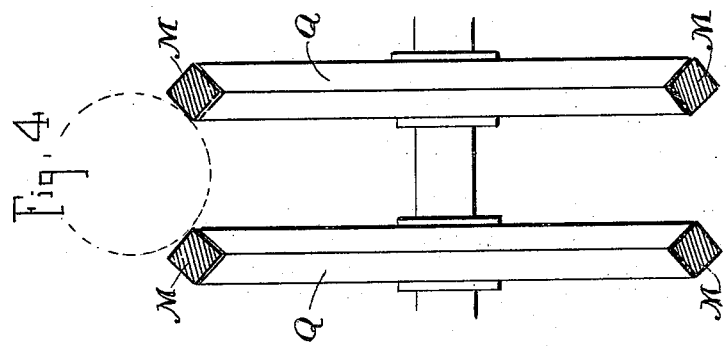
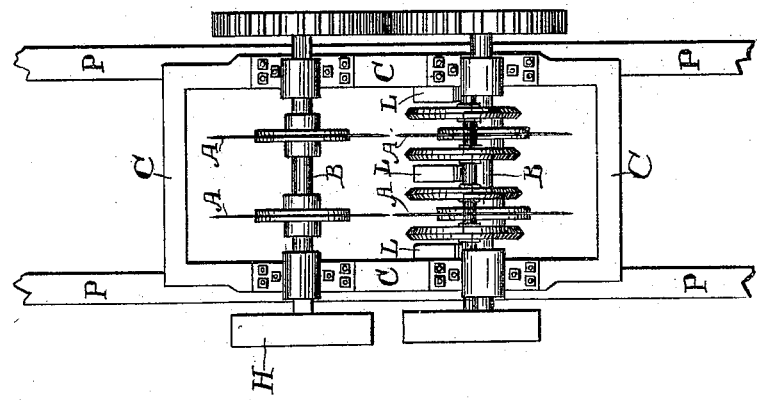
Witnesses
Inventor

UNITED STATES PATENT OFFICE.

SIVERT H. SHELLEY, OF BERRYESSA, CALIFORNIA.

FRUIT-SPLITTING MACHINE.

SPECIFICATION forming part of Letters Patent No. 554,037, dated February 4, 1896.

Application filed July 25, 1895. Serial No. 557,136. (No model.)

*To all whom it may concern:*

Be it known that I, SIVERT H. SHELLEY, a citizen of the United States, residing at Berryessa, county of Santa Clara, State of California, have invented an Improvement in Fruit-Splitting Machines; and I hereby declare the following to be a full, clear, and exact description of the same.

My invention relates to the class of machines for pitting or stoning fruit, and especially to that sub-class particularly adapted for the handling of clingstone peaches in which the operation is performed by the complete splitting of both the flesh and pit of the peach.

My invention consists of the constructions and combinations of parts hereinafter described and claimed.

Heretofore in fruit-pitting machines it has been common to employ opposing rotary cutters in the shape of circular disks, with or without serrated edges, or in the shape of knife-blades, but owing to the fact that until comparatively recently it was not contemplated to split or sever the pit as well as the flesh of the fruit, the machines above referred to as employing rotary cutters have these cutters so mounted as to yield or separate before the passing pit, and allow the pit to pass through between them without being cut into or severed at all, it being the intention merely to cut the flesh to the pit. This operation, while answering perfectly with most kinds of fruit, is useless in operating upon clingstone peaches, for the reason that the flesh will not drop away from the pit, and this has led to the attempt to cut entirely through the pit as well as through the flesh. Accordingly there has been suggested in one case a fixed knife and a rotary knife which, in its operation, overlaps the cutting edge of the fixed knife so as to cut positively through the pit. I have found, however, by experience that the older and better forms of rotary disk cutters are adapted for the purpose of cutting through the pit without the necessity of making their cutting edges overlap or even meet each other, by mounting said cutters upon fixed bearings so that they will be rigid with respect to one another, thereby forcing them to cut into the pit; and by bringing their edges close together the pit will be so nearly cut through that the weight of the halves of the fruit will cause the pit to drop apart after leaving the cutters.

The object of my invention, therefore, is to provide a machine adapted for the splitting of clingstone peaches of a simple, effective and practical character, economical in its construction and operation and not liable to get out of order.

Referring to the accompanying drawings, Figure 1 is a side elevation of my machine. Fig. 2 is a plan of same, the carrier-ropes M being in section where they pass around the pulleys. Fig. 3 is an end view. Fig. 4 is an enlarged detail to show the shape of the carrier-ropes.

The machine consists of cutters A in the shape of disks, said cutters opposing each other in the same plane, and preferably mounted in a vertical plane. There may be as many opposing pairs of these cutters in one machine as may be desirable, and for the purpose of illustration I have here shown two pairs.

The cutters are fixed on shafts or axles B B and revolve in the directions indicated by the arrows—that is, toward each other. They are carried in a suitable frame C, and the members of each pair have their peripheries nearly touching or sufficiently near to cut well into the stone of the fruit. The cutter-shafts are geared together so that they may be driven in unison, by power applied to the wheel H or otherwise. The shafts which carry the cutters are mounted in fixed bearings on the frame C, so that the cutters are held rigid with relation to their position to one another, and cannot separate before the passing pit, but are forced to cut into said pit.

Q are pulleys carrying endless belts or ropes M, which form the carriers for the fruit. These belts or ropes are parallel to each other, and the fruit is placed upon and lies between adjacent pairs of belts or ropes. These belts or ropes are square or angular in cross-section, as shown, and are so arranged that their sides form tangents to the surface of the fruit, and they thus make a V-shaped groove for the peach to rest in. The peach is thus held steady. These belts or ropes are guided by means of suitable bars L.

The frame C is fixed to upright posts P.

Having thus described my invention, what I claim as new, and desire to secure by Letters Patent, is—

1. A fruit-splitting machine comprising opposing rotary cutters in the same plane and having their edges brought closely together, said cutters being mounted upon fixed bearings, whereby they are held rigid with respect to one another, and a suitable carrier for advancing the fruit to and between the cutters, consisting of parallel opposing belts or ropes, square or angular in cross-section with their sides tangential to the fruit-surface whereby V-shaped grooves are formed in which the fruit rests.

2. A fruit-splitting machine comprising opposing cutters having their edges brought close together, and a carrier for advancing the fruit consisting of separated pulleys arranged in pairs at opposite ends of the machine, having V-shaped grooves in their peripheries, and opposing, separated, parallel belts or ropes passing around said pulleys and having a square cross-section whereby they fit the grooves of the pulleys and present their sides tangential to the fruit, the opposing belts of each pair jointly forming a V-shaped channel in which the fruit rests.

In witness whereof I have hereunto set my hand.

SIVERT H. SHELLEY.

Witnesses:
WM. WYMAN,
H. F. DUSING.